H. F. NEWMAN.
ROTARY DISTRIBUTING NOZZLE OR SPRINKLER HEAD.
APPLICATION FILED MAY 16, 1908.

974,176.

Patented Nov. 1, 1910.

Witnesses
Frank A. Fahle
Thomas W. McMeans

Inventor
Herman F. Newman,
By Bradford F. Hood,
Attorneys.

UNITED STATES PATENT OFFICE.

HERMAN F. NEWMAN, OF INDIANAPOLIS, INDIANA.

ROTARY DISTRIBUTING-NOZZLE OR SPRINKLER-HEAD.

974,176.

Specification of Letters Patent. Patented Nov. 1, 1910.

Application filed May 16, 1908. Serial No. 433,191.

*To all whom it may concern:*

Be it known that I, HERMAN F. NEWMAN, a citizen of the United States, residing at Indianapolis, in the county of Marion and State of Indiana, have invented certain new and useful Improvements in Rotary Distributing-Nozzles or Sprinkler-Heads, of which the following is a specification.

The object of my present invention is to produce an improved automatic rotary distributing nozzle or sprinkler head by means of which water may be widely and effectively distributed when the valve is open.

It further consists in improved means for holding the valve closed and in which the provision for causing the same to automatically open in case of fire is of a superior character.

Figure 1:
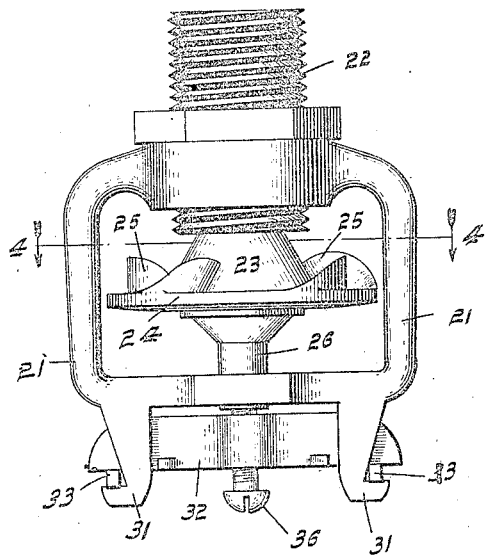
Figure 2:
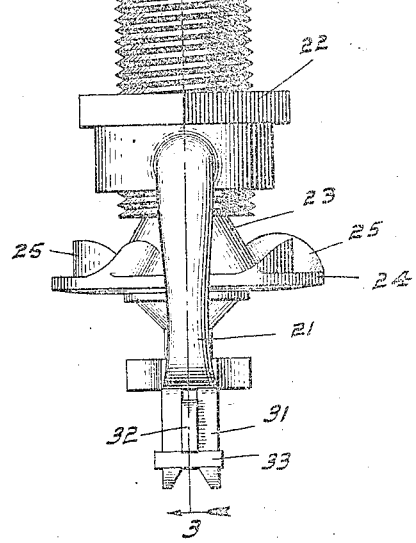
Figure 3:
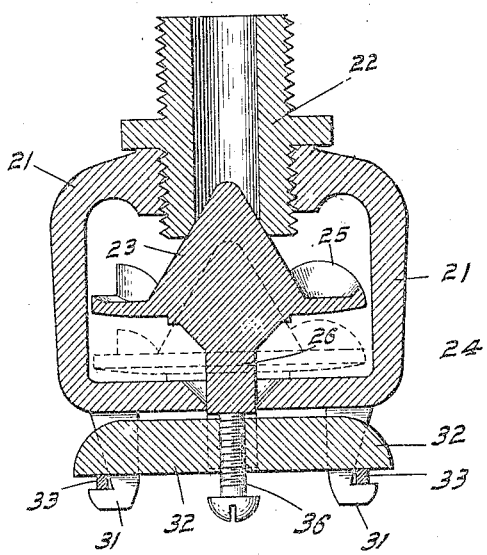
Figure 4:
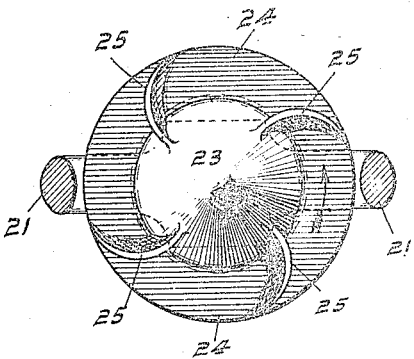

Referring to the accompanying drawings, which are made a part hereof, and on which similar reference characters indicate similar parts, Figure 1 is a side elevation of a sprinkler head of the character in question embodying my present invention; Fig. 2 an edge elevation of the same; Fig. 3 a longitudinal sectional view thereof at the point indicated by the dotted line 3, 3 in Fig. 2, and Fig. 4 a sectional plan view as seen when looking in the direction indicated by the arrows from the dotted line 4, 4 in Fig. 1.

The valve cage or frame 21 is shown as connected to a coupling 22 by means of which the sprinkler head is adapted to be united to the water supply pipe (not shown). This union is effected by an ordinary screw-thread formation, as shown in the drawings. The lower end of the coupling 22 constitutes the valve seat.

The combined valve and water-distributing device consists of a conical member 23 forming the valve proper, and which is adapted to fit the valve seat on the lower end of coupling 22, and a plate 24 projecting out from the lower portion of said conical central part and provided on its upper surface with spirally set wings 25 and a guiding stem 26 which extends through a suitable guiding perforation on the lower transverse bar of cage 21. This structure when in the position shown by the full lines in Fig. 3 constitutes a tightly closed and very effective valve; but, when moved to the position shown by the dotted lines in Fig. 3 permits the free egress of the water through the tubular portion of coupling 22. The stream striking the point of the conical valve, is evenly separated, spreading to all sides thereof, and in this condition is guided against the distributing plate 24, from which it is thrown outwardly in all directions. The spirally set blades 25 act like the blades of a water wheel, and cause the whole structure to rapidly revolve, and this adds considerable to the distributing efficiency of the apparatus, as the rapidly whirling motion imparts to the water a powerful centrifugal action.

Extending downwardly from the transverse member of the frame or cage in which the guiding stem to the valve structure is mounted are hooked arms 31 between which a supporting bar 32 is placed by means of which the valve structure may be held up to the position where the valve is closed. The bar 32 is held to this position, as best shown in Figs. 1 and 3, by means of small transversely placed bars 33, of fusible metal, which are interposed between the hooks of arms 31 and the under side of said bar 32. It will be noticed that these small bars of fusible metal are unusually well exposed to external influences. Consequently, in case of fire, one or both of these bars will melt very quickly, so that the sprinkler head will get into operation in the shortest possible time after the beginning of the conflagration.

A screw 36 is mounted in the bar 32, which screw comes in immediate contact with the lower end of guiding stem 26 on the valve structure. This screw is of considerable importance for several reasons: It permits of a proper adjustment of the parts so that the valve can be properly closed without the necessity of accurately machining all of the contacting surfaces. It also permits the fusible metal bars 33 to be inserted somewhat loosely, which enables them to be handled quickly and conveniently; and, after they are inserted, the valve can be forced tightly against its seat by a few turns of said screw 36.

Having thus fully described my said invention, what I claim as new, and desire to secure by Letters Patent, is:—

1. The combination, in a rotary distributing nozzle, of a main cage or body having open sides and provided with a valve seat above said open sides and a valve-stem-guiding perforation opposite the said valve seat, a valve positioned between said valve seat and the member containing said perforation and provided with a stem extending out through said perforation, arms extending out from the main body on opposite sides of said valve-stem-guiding perforation, a bar adapted to be carried by said arms at least one of said arms being provided with hook-like portions, and an independent support composed of fusible metal adapted to rest on the hook-like portion beneath the bar when in engaged relation thereto and thus support said bar and through it the valve-stem and valve.

2. The combination, in a sprinkler system, with an eduction pipe having a valve seat in its discharge end, of a cage or frame on said eduction pipe forming a carrier for the valve, a valve mounted therein and adapted to fit said valve seat and provided with a stem extending out therefrom in line with the discharge orifice of the eduction pipe and passing through a valve-stem-guiding perforation in the main body or cage, two pairs of hooked arms extending out from the body or cage in the vicinity of the valve-stem-guiding perforation, a supporting bar adapted to be carried by said pairs of arms, small bars of fusible metal adapted to rest on the hook-like portions of the arms beneath the bar and thus support said bar, and an adjusting screw mounted in said bar and engaging with the end of the valve-stem whereby the valve may be adjustably held to its seat.

3. The combination, in a sprinkler system, with an eduction pipe having a valve seat in its discharge end, of a cage or frame on said eduction pipe forming a carrier for the valve, a valve mounted therein and adapted to fit said valve seat and provided with a stem extending out therefrom in line with the discharge orifice of the eduction pipe and passing through a valve-stem-guiding perforation in the main body or cage, two pairs of hooked arms extending out from the body or cage in the vicinity of the valve-stem-guiding perforation, a supporting bar adapted to be carried by said pairs of arms, small bars of fusible metal adapted to rest on the hook-like portions of the arms beneath the bar and thus support said bar, and an adjusting screw mounted in said bar and engaging with the end of the valve-stem whereby the valve may be adjustably held to its seat said valve being provided with a distributing plate having spirally set wings in its upper surface whereby the valve structure will be given a rotary movement by the force of the water as it emerges from the eduction pipe.

In witness whereof, I, have hereunto set my hand and seal at Indianapolis, Indiana, this eleventh day of May, A. D. one thousand nine hundred and eight.

HERMAN F. NEWMAN. [L. S.]

Witnesses:
KATHERINE C. FLETCHER,
THOMAS W. MCMEANS.